(12) United States Patent
Ishii (10) Patent No.: US 7,183,618 B2
(45) Date of Patent: Feb. 27, 2007

(54) HINGE FOR MICRO-MIRROR DEVICES

(75) Inventor: Fusao Ishii, 350 Sharon Park Dr., G26, Menlo Park, CA (US) 94025

(73) Assignee: Fusao Ishii, Menlo Park, CA (US)

( * ) Notice: Subject to any disclaimer, the term of this patent is extended or adjusted under 35 U.S.C. 154(b) by 133 days.

(21) Appl. No.: 10/918,677

(22) Filed: Aug. 14, 2004

(65) Prior Publication Data

US 2006/0034006 A1  Feb. 16, 2006

(51) Int. Cl.
G02B 26/08 (2006.01)

(52) U.S. Cl. ............... 257/415; 257/432; 257/E31.127; 438/31; 359/224; 359/318

(58) Field of Classification Search ............... 359/224, 359/318, 291, 295, 321; 257/432, 415, E31.127; 438/31
See application file for complete search history.

(56) References Cited

U.S. PATENT DOCUMENTS

| | | | | |
|---|---|---|---|---|
| 3,886,310 | A * | 5/1975 | Guldberg et al. | 348/771 |
| 5,083,857 | A | 1/1992 | Hornbeck | |
| 5,142,405 | A | 8/1992 | Hornbeck | |
| 5,552,924 | A * | 9/1996 | Tregilgas | 359/224 |
| 5,631,782 | A * | 5/1997 | Smith et al. | 359/871 |
| 5,650,881 | A * | 7/1997 | Hornbeck | 359/871 |
| 5,652,671 | A | 7/1997 | Knipe et al. | |
| 5,699,181 | A * | 12/1997 | Choi | 359/291 |
| 6,038,056 | A | 3/2000 | Florence et al. | |
| 6,198,180 | B1 * | 3/2001 | Garcia | 310/36 |
| 6,351,330 | B2 * | 2/2002 | Ko et al. | 359/298 |
| 6,447,126 | B1 | 9/2002 | Hornbeck | |
| 6,867,897 | B2 * | 3/2005 | Patel et al. | 359/291 |
| 2003/0142383 | A1 * | 7/2003 | Nanjyo et al. | 359/224 |
| 2003/0234994 | A1 | 12/2003 | Pan | |
| 2004/0061961 | A1 * | 4/2004 | Valette | 359/872 |
| 2004/0141894 | A1 | 7/2004 | Mizuno et al. | |
| 2005/0111119 | A1 * | 5/2005 | Oldham et al. | 359/849 |

OTHER PUBLICATIONS

M.R. Douglass, "Lifetime Estimates and Unique Failure Mechanisms of the Digital Micromirror Device", IEEE International Reliability Physics Symposium, 36th Annual, pp. 9-16, Apr. 1998.
Gad-el-Hak, M., ed., The MEMS Handbook, Boca Raton, CRC Press, 2002.

* cited by examiner

Primary Examiner—Bradley K. Smith
Assistant Examiner—Steven J. Fulk (57) ABSTRACT

An improved hinge for a micro-mirror device composed of a conductive doped semiconductor and immune to plastic deformation at typical to extreme temperatures. The hinge is directly connected to the micro-mirror device and facilitates the manufacturing of an optically flat micro-mirror. This eliminates Fraunhofer diffraction due to recesses on the reflective surface of the micro-mirror. In addition, the hinge is hidden from incoming light thus improving contrast and fill-factor.

13 Claims, 6 Drawing Sheets

HINGE FOR MICRO-MIRROR DEVICES

TECHNICAL FIELD

This invention relates to micro-mirror devices having one or more moveable elements that are moveable by means of a hinge.

BACKGROUND ART

The field of microelectromechanical systems (MEMS) has experienced an explosive growth during the last decade having found applications in accelerometers, pressure sensors, actuators and the miniaturization of various other mechanical devices. Electromechanical micromirror devices are an example of a MEMS device that has drawn considerable interest because of their application as spatial light modulators (SLMs).

A spatial light modulator requires an array of a relatively large number of such micromirror devices. In general, the number of devices required ranges from 60,000 to several million for each SLM. A digital micro-mirror device (DMD) is one example of a micro-mechanical SLM. One or more hinges support each mirror and allow the mirrors to tilt. Images are formed by selectively tilting each mirror to reflect or not reflect an incident source of light onto an image plane.

In a typical video application, each mirror is expected to switch over 66,000 times per second. Therefore, the design and material of the hinge is critical to DMD reliability.

The main reliability concern regarding the hinge is plastic deformation. Through continued use and operation in extreme temperatures, the hinge undergoes mechanical deformation, also known as creep. The relaxation of the hinge results in a residual tilt when all voltages are removed. This, so called hinge memory, is discussed in Douglass, "Lifetime Estimates and Unique Failure Mechanisms of the Digital Micromirror Device," IEEE International Reliability Physics Symposium, 36th Annual, pp. 9–16, April 1998. As discussed in this paper, mirrors will not function properly when the residual tilt exceeds approximately 35 to 40% of the 10-degree rotation angle. In addition, while duty-cycle contributes to creep, the dominant factor for hinge memory lifetime is temperature.

In U.S. Pat. No. 5,142,405, the mirror is tilted by means of an electrostatic force created by biasing the mirror and address electrodes appropriately. The advantage of biasing the mirror is that a lower address voltage can be used to achieve electrostatic motion. Through the use of the appropriate mirror bias, bistable operation can be achieved with standard 5V CMOS address circuitry. The address voltage applied, however, requires enough operating margin to compensate for the residual tilt resulting in further design complexity.

U.S. Pat. No. 5,083,857 describes a DMD pixel architecture that improves contrast and brightness by placing the hinge and mirror support post under the rotatable mirror surface. The hinge, however, is composed of an aluminum alloy that is highly susceptible to metal creep. In addition, the support post connecting the hinge to the mirror forms a recess on the surface of the mirror. This recess is defined by the edges of the support post and is also known as a spacervia. The edges of the spacervia diffract the incident light into the projection system optics when the mirrors are tilted to the off state, thus limiting the pixel architecture's improvement to contrast ratio. This diffraction effect is known as Fraunhofer diffraction.

U.S. Pat. No. 6,038,056 improves upon the prior art of U.S. Pat. No. 5,083,857 by reducing Fraunhofer diffraction resulting from the support post edges. This is accomplished by reducing the dimensions of the support post edges and orienting the support post edges and mirror edges to be parallel to each other and at 45-degrees with respect to the incident light.

U.S. Pat. No. 5,631,782 and U.S. Pat. No. 6,447,126 describe a mirror support pillar in which the top of the pillar is covered and closed. This improvement eliminates the recess on the mirror surface of prior art and thus provides a method to eliminate the diffraction due to spacervias. However, this process can not produce an optically flat mirror since the underlying spacer layer is not flat.

U.S. Pat. No. 5,652,671 also improves upon the prior art by proposing a hinge fabricated from alternating layers of different materials. While this reduces the hinge memory by providing a more elastic hinge, it does not eliminate it. Furthermore, the formation of the multi-layer hinge results in a more complicated manufacturing process as compared to a hinge made of a single material.

Alternatives to hinges composed of metal alloys are hinges composed of semiconductor material. Silicon is the dominant material used throughout the IC industry today. Furthermore, single crystal silicon is considered a perfect elastic material at normal temperatures. As discussed in Gad-el-Hak, M., ed., The MEMS Handbook, Boca Raton, CRC Press, 2002, pg. 16–23, silicon exhibits no plastic deformation or creep below 800 degrees Celsius. In addition, impurity atoms, also known as dopants, can be introduced into the semiconductor thereby altering its electrical properties. The result is a doped semiconductor in which its conductivity can be controlled by dopant concentration. These characteristics offer significant advantages over aluminum alloy hinges in both reliability and manufacturing complexity.

US 20030234994 describes a reflective SLM in which the hinge is composed of doped silicon and the mirror is biased appropriately to achieve electrostatic deflection under a 5V CMOS design. US 20040141894 also describes a micromirror unit composed of doped silicon. These and other prior art utilizing doped semiconductors for their hinge material fail to provide a device architecture in which the hinge is hidden from incoming light. This is an important disadvantage which results in poor contrast and fill-factor in applications such as image projection.

Despite significant advances that have been made in recent years, there is still a need for improvement in the performance and reliability of these hinges. Specifically, there is a need in the art for a conductive hinge that is less complex to manufacture and not susceptible to creep under typical to extreme temperatures. In addition, there exists a need for a hinge architecture that facilitates the fabrication of an optically flat mirror thus eliminating Fraunhofer diffraction while improving contrast and fill-factor.

SUMMARY OF THE INVENTION

The present invention provides a hinge for a micro-mirror device that overcomes some of the limitations of the prior art. According to the present invention, a hinge is composed of a doped semiconductor and designed such that it connects directly to the micro-mirror surface opposite the substrate.

Many of the advantages of the present invention are due to the material of which the hinge is composed. A doped semiconductor hinge offers a conductive means by which the micro-mirror can be biased while improving elasticity and simplifying the manufacturing process. In addition the material is robust under extreme temperatures and immune to the memory hinge effects caused by creep. Furthermore, the hinge architecture according to the present invention facilitates the fabrication of an optically flat mirror and further simplifies the manufacturing process by allowing a direct connection to the micro-mirror.

DETAILED DESCRIPTION OF THE INVENTION

Figure 1A:
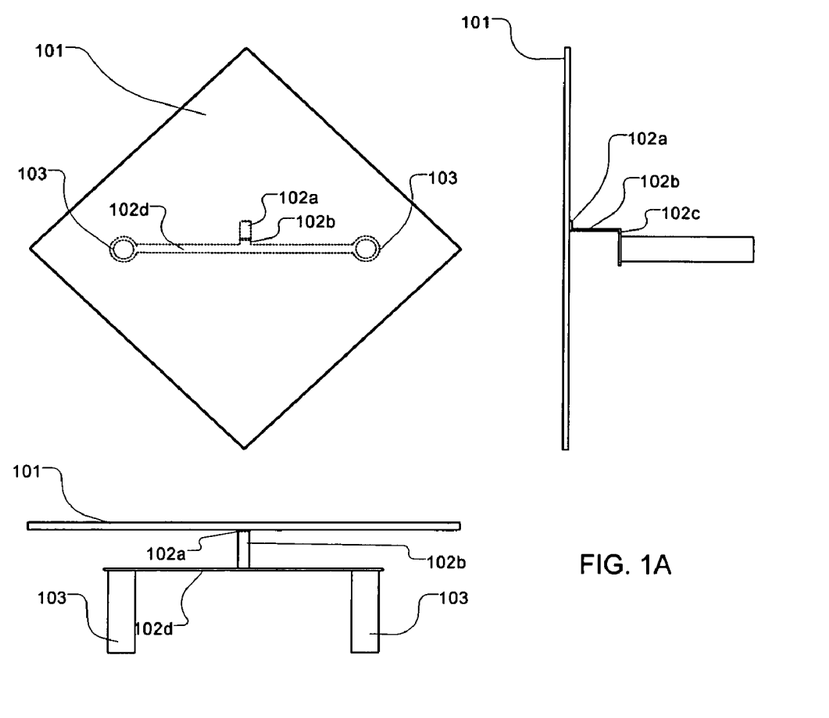
FIGS. 1A and 1B show top, side, and perspective views of the hinge according to the present invention in the preferred embodiment.
Figure 1B:
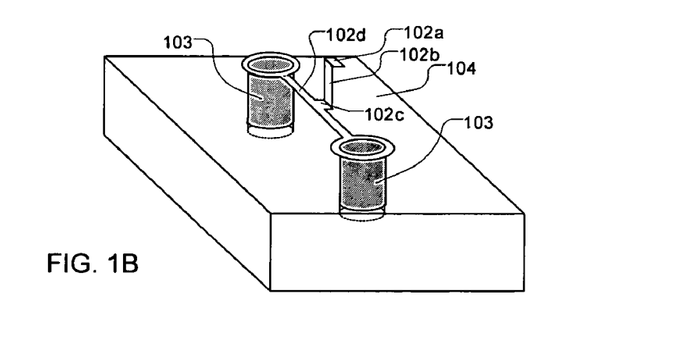

FIG. 1A shows top and side views of the hinge according to the present invention in the preferred embodiment. In this figure, hinge 102, best described as a compound torsion vertical cantilever, is composed of segments 102a, 102b, 102c and 102d. Segment 102a extends out parallel to the substrate surface and is connected directly to the surface of micro-mirror 101 opposite the substrate. Segment 102b extends out perpendicular to the substrate surface and is connected to segment 102a. The other end of segment 102b is connected to an extension (102c) of segment 102d. Segment 102d is itself a direct extension of support posts 103. Support posts 103 extend below the surface of the substrate (104) and anchor the compound hinge structure (102) to the substrate (104). The thickness of hinge 102 is small relative to the micro-mirror in order to ensure most of the bending occurs at the hinge. This improves the flatness of the micro-mirror in its deflected state. FIG. 1B shows a perspective view of the hinge according to the present invention in the preferred embodiment.

Figure 2A:
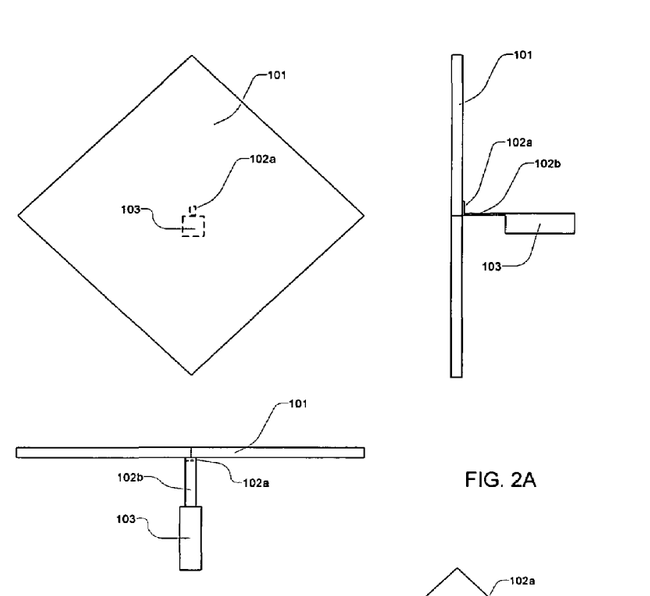
FIGS. 2A–2C show top, side, and perspective views of the hinge according to the present invention in an alternate embodiment.
Figure 2B:
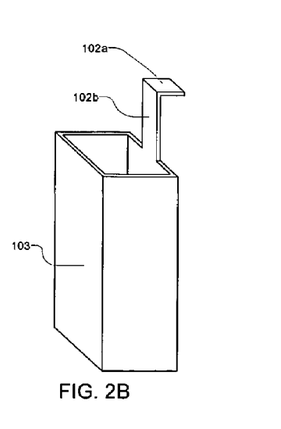
Figure 2C:
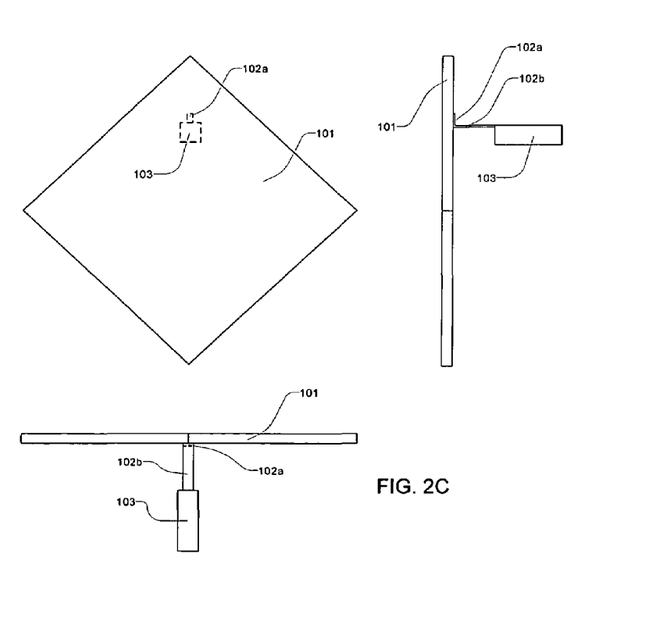

FIGS. 2A–2C show top, side and perspective views of the hinge according to the present invention in an alternate embodiment. In these figures, hinge 102, best describe as a vertical cantilever, is composed of segments 102a and 102b. Segment 102a extends out parallel to the substrate surface and is connected directly to the surface of micro-mirror 101 opposite the substrate. Segment 102b extends out perpendicular to the substrate surface and is connected to segment 102a. Segment 102b is itself a direct extension of support post 103. FIG. 2C shows a slight modification to the alternate embodiment in FIG. 2A in which the contact point between the micro-mirror (101) and hinge 102 is located away from the geometric center of the micro-mirror (101).

Figure 3A:
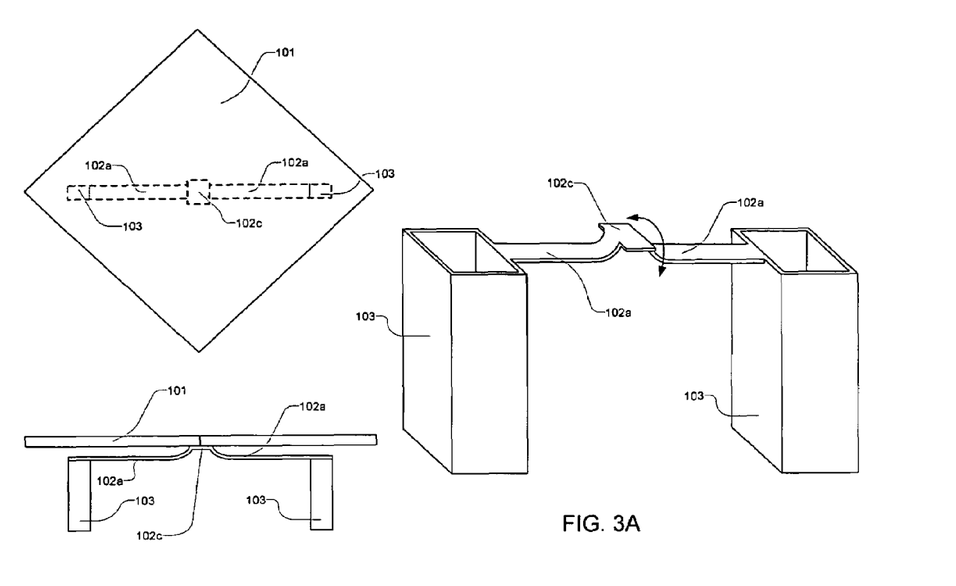
FIGS. 3A and 3B show top, side, and perspective views of the hinge according to the present invention in a second alternate embodiment.
Figure 3B:
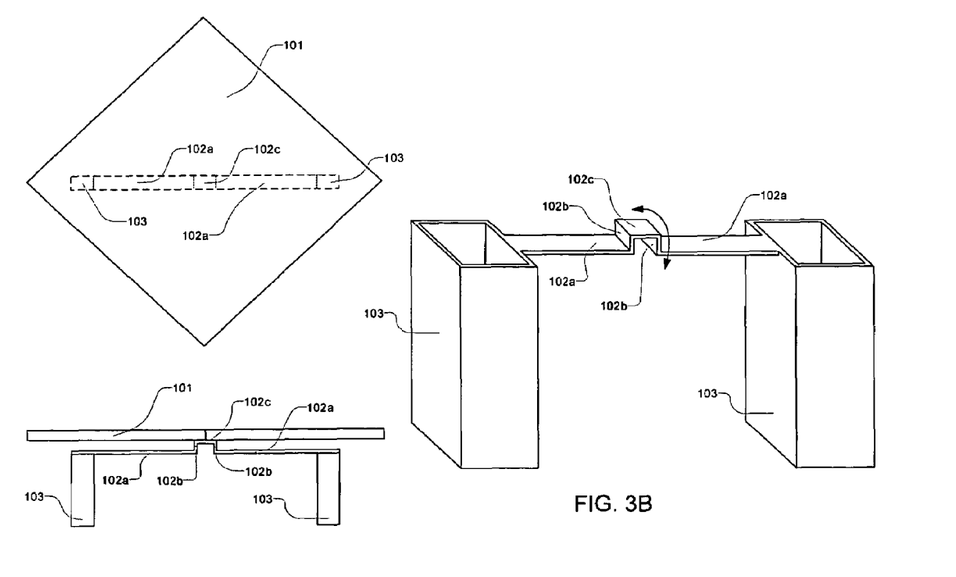

FIGS. 3A and 3B show top, side and perspective views of the hinge according to the present invention in a second alternate embodiment. In FIG. 3A hinge 102 is a torsion hinge and is composed of segments 102a and 102b. Segments 102a are extensions of support posts 103. Segments 102a extend horizontally away from support posts 103 toward each other and gradually bend vertically near the center where they meet horizontal segment 102b. FIG. 3B shows a slight modification to the alternate embodiment in FIG. 3A in which segments 102a do not bend, but instead connect to vertical segments 102b and segments 102b connect to horizontal segment 102c.

Figure 4A:
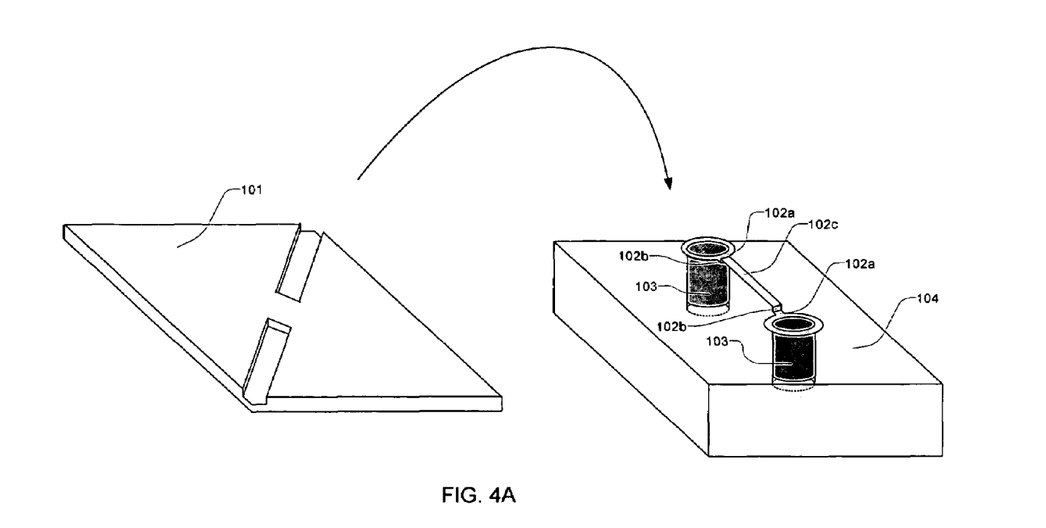
FIGS. 4A and 4B show top, side, and perspective views of the hinge according to the present invention in a third alternate embodiment.
Figure 4B:
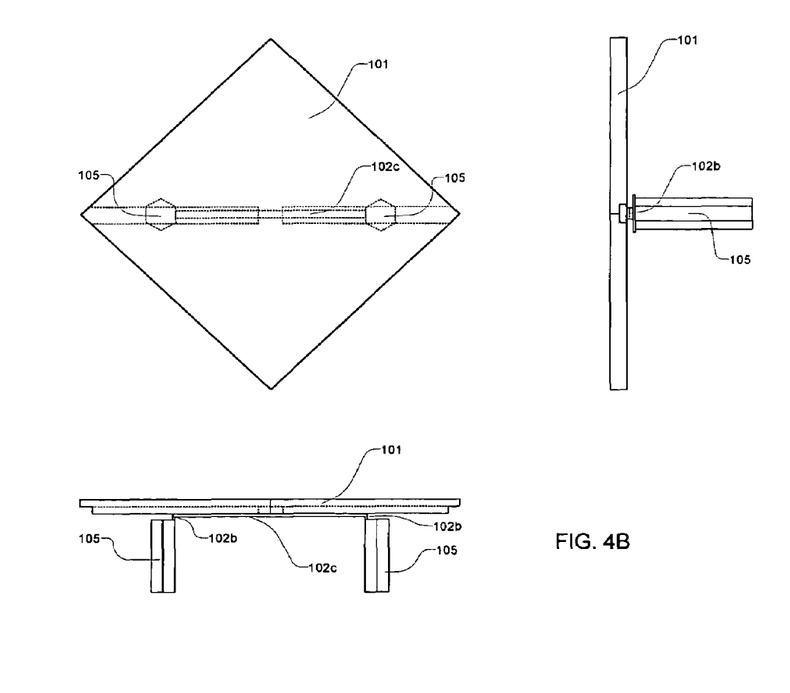

FIGS. 4A and 4B show top, side, and perspective views of the hinge according to the present invention in a third alternate embodiment. In FIG. 4A, hinge 102 is a torsion hinge and is composed of segments 102a, 102b, and 102c. Segments 102a are extensions of support posts 103. Segments 102a extend horizontally away from support posts 103 and toward each other. Horizontal segment 102a is connected to vertical segment 102b near support posts 103. The other end of vertical segment 102b is connected to horizontal segment 102c. FIG. 4B shows two slight modifications to FIG. 4A in which segment 102b extends vertically away from support posts 103 and is connected to segment 102c, thus eliminating segment 102a. This figure also shows a polygon shaped support post 103 instead of round shaped support post 103. For the embodiments described in FIGS. 4A and 4B, the micro-mirror surface opposite the substrate must be raised away from segment 102c except near the center where micro-mirror 101 comes into contact with segment 102c.

Figure 5A:
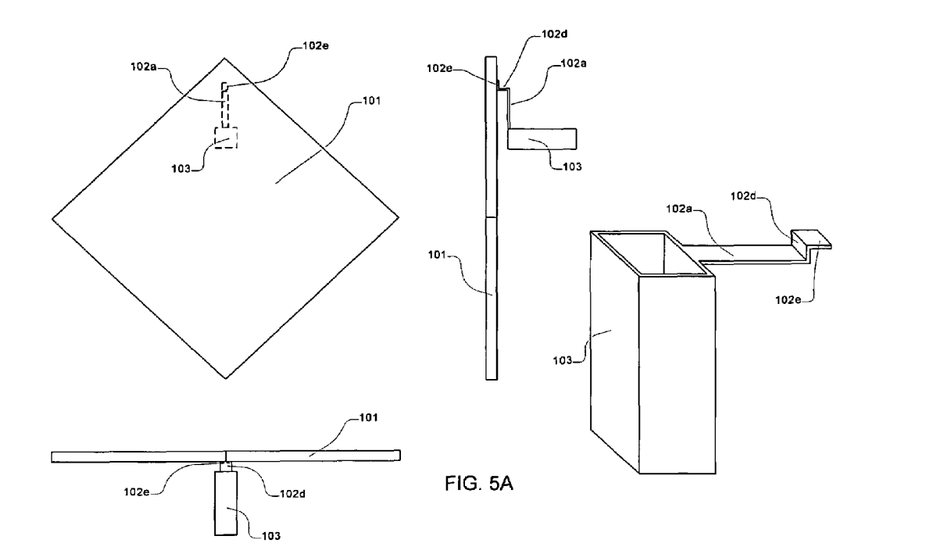
FIGS. 5A and 5B show top, side, and perspective views of the hinge according to the present invention in a fourth alternate embodiment.
Figure 5B:
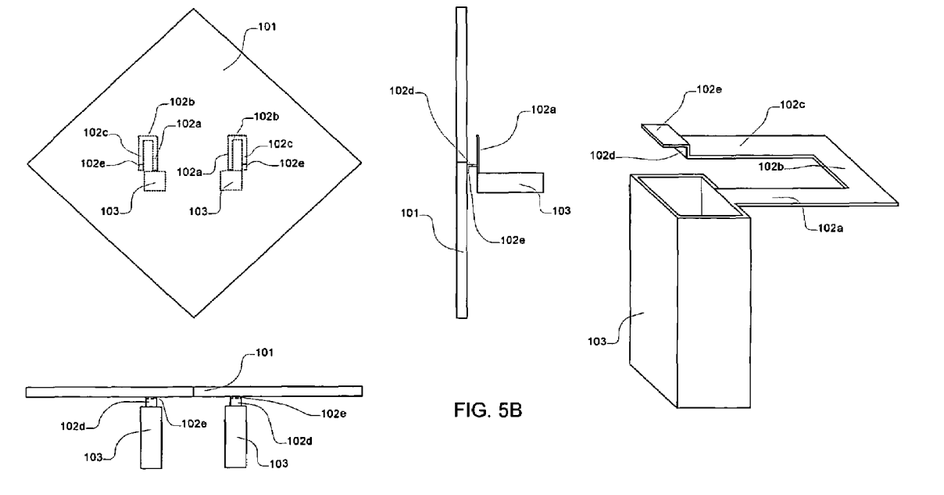

FIGS. 5A and 5B show top, side, and perspective views of the hinge according to the present invention in a fourth alternate embodiment. In FIGS. 5A and 5B, hinge 102 is a cantilever and is composed of segments 102a, 102d, and 102e. Segment 102a is an extension of support post 103. In FIG. 5A, segment 102a extends away from support post 103 horizontally and connects to vertical segment 102d. Vertical segment 102d connects to horizontal segment 102e. Segment 102e connects directly to the surface of the micro-mirror opposite the substrate. In FIG. 5B, hinge 102 is composed of segments 102a, 102b, 102c, 102d and 102e. Segment 102a extends out horizontally and away from support post 103 and connects to segment 102b which runs parallel to the substrate surface and perpendicular to segment 102a. Segment 102b is connected to segment 102c. Segment 102c is connected to vertical segment 102d. Segment 102d is connected to horizontal segment 102e. Segment 102e is connected to the surface of micro-mirror 101 opposite the substrate. In addition, FIG. 5B shows two hinges (102) supporting micro-mirror 101.

Figure 6:
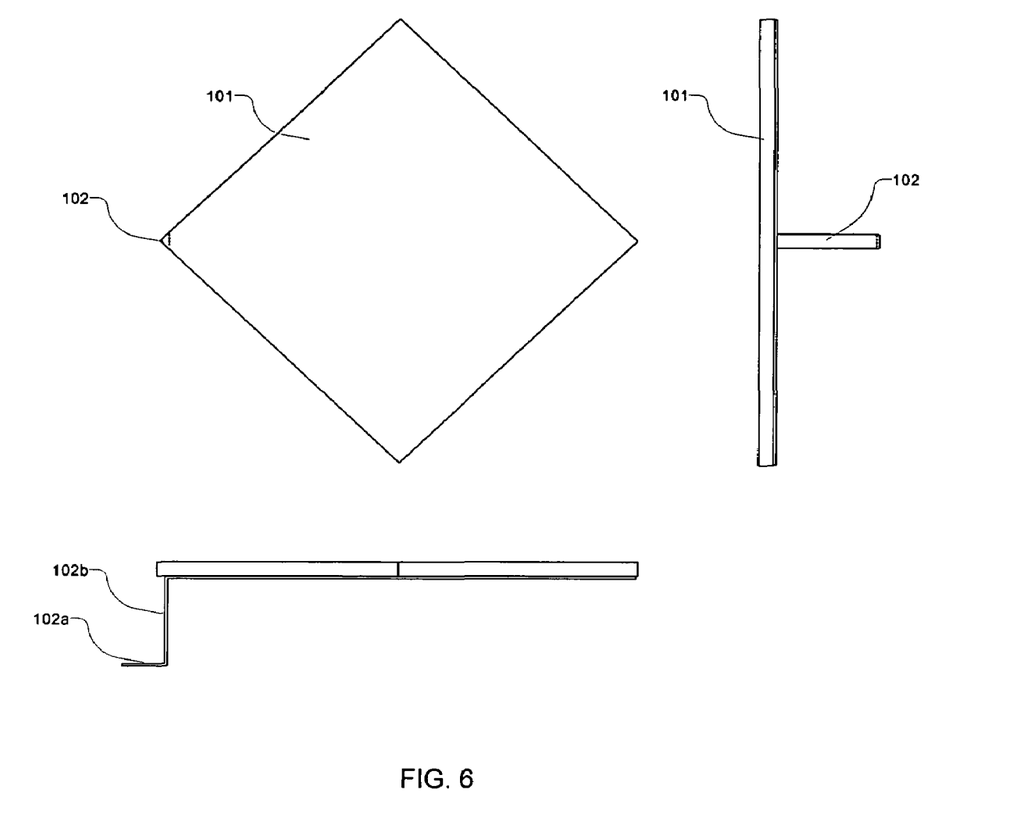
FIG. 6 shows top and side views of the hinge according to the present invention in a fifth alternate embodiment.

FIG. 6 shows top and side views of the hinge according to the present invention in a fifth alternate embodiment. In FIG. 6, hinge 102 is a vertical cantilever and is composed of two segments 102a and 102b. Segment 102b extends away from the substrate surface and connects directly to micro-mirror 101. The hinge (102) is directly anchored to the substrate by horizontal extension 102a.

The structures described in the preferred and alternative embodiments of the present invention can be composed of a doped semiconductor convenient to conventional processing steps used during the fabrication of micro-mirror devices. Various semiconductors are available for micro-mirror device manufacturing and are typically selected based on the specific application and control circuit design of the device. In general, semiconductors consist of elemental semiconductors, III–V compound semiconductors, II–VI compound semiconductors, IV compound semiconductors, and alloy semiconductors. Specific examples are silicon (Si), germanium (Ge), gallium arsenide (GaAs), indium gallium arsenide (InGaAs), indium phosphide (InP), and silicon germanium (SiGe). In the case of silicon, the material has been further subcategorized as amorphous, polycrystalline, or single crystal silicon. The source of this material within the manufacturing process can be an SOI substrate, an SOS substrate, a bulk substrate wafer slice from single crystal ingot, epitaxial layers or from thin film deposition. Common epitaxy methods include solid-phase epitaxy, vapor-phase epitaxy, liquid-phase epitaxy, and molecular-beam epitaxy. Common thin film deposition methods are deposition by electron-beam, filament, flash, or physical evaporation, sputtering, and chemical vapor deposition (CVD). Various CVD methods exist and are currently being developed. A few examples include electron resonant CVD, MOCVD, HFCVD, Cat-CVD, APCVD, LPCVD, and PECVD.

Impurities can be added to these materials to change their mechanical and electrical characteristics by various processes including constant-source diffusion, limited-source diffusion, two-step diffusion, substrate autodoping, substrate out-diffusion, and ion-implantation. Two-step diffusion is the process in which a short constant-source diffusion called the predeposition step, is followed by a limited-source diffusion called the drive-in step. Impurities can also be introduced during deposition or crystallization, also know as in situ. While these impurities can be chosen from almost any element in the periodic table, the impurities most commonly used are group III, group IV, group V, and group VII elements. Some examples of these impurities are fluorine, silicon, phosphorous, boron, arsenic, antimony, gallium, indium and aluminum. The source of these impurities can be layers of silicon glass such as PSG, BSG, BPSG, AsSG, and SbSG. Numerous other solid, liquid, and gaseous sources exist as well. Examples of these are arsine, diborane, phosphine, boron trioxide, trimethylborate, boron nitride, boron tribromide, phosphorous pentoxide, ammonium monophosphate, ammonium diphosphate, phosphorus oxycloride, arsenic trioxide, antimony trioxide, antimony pentachloride, silane, dichlorosilane, and stabine.

In the case where impurities are added by ion-implantation, annealing is required to electrically activate the implanted impurities as well as to remove damage caused by the implantation. Many methods exist to carry out this process including furnace annealing, laser annealing, rapid thermal annealing, lamp annealing and electrical conduction heating.

The final assembly of the micro-mirror unit can be completed by a few different methods. Examples of these methods are self-assembly, wafer bonding, and monolithic fabrication. Self-assembly is achieved by adding the substrate and micro components to a wet solution in which the micro components self attach themselves to the binding sites on the substrate. Wafer bonding permits the joining of semiconductor devices to other materials or substrates and consists of adhesive bonding, silicon fusion bonding, and anodic bonding. Monolithic fabrication involves the use of several processing steps such as oxidation, photolithography, etching, diffusion, evaporation or sputtering, chemical vapor deposition, ion implantation, epitaxy, and annealing to build devices on the substrate.

In the preferred embodiment, the present invention is implemented in a CMOS manufacturing process. Polycrystalline silicon, also known as polysilicon is a material that is commonly available in a CMOS manufacturing process. The preferred source of the polysilicon is a thin film deposited by LPCVD, doped by ion-implantation using phosphine gas and annealed by rapid thermal annealing. The preferred method of final assembly is monolithic fabrication of the micro-mirror on the substrate.

The advantage of having such a wide array of materials and doping methods to construct the hinge is that the present invention can simplify the manufacturing of present micromicro devices.

The hinge structure in the preferred and alternative embodiments offer different advantages over the prior art. With respect to prior art utilizing a doped or undoped semiconductor hinge, the present invention offers an increase in the density of micro-mirror devices manufactured on a substrate by placing the device on a different plane from the support structure. With respect to prior art describing alternating layers of hinge materials, the present invention offers a simplified process by implementing a hinge composed of a single material. Furthermore, the present invention is robust under extreme temperatures as well as immune to metal creep. With respect to the prior art in which the hinge is hidden from incoming light, the present invention eliminates the need for support pillars or spacervias connecting the hinge to the micro-mirror. This simplifies the manufacturing process, eliminates Fraunhofer diffraction due to spacervias and provides for an optically flat mirror.

Though the invention has been described with respect to specific preferred and alternative embodiments, many additional variations and modifications will become apparent to those skilled in the art upon reading the present application. Referring again to FIGS. 1A and 1B, one such modification is comprised of segment 102b connected directly to segment 102d, thus eliminating extension 102c. Another variation is the use of multiple vertical cantilever segments (102b) connected to segment 102d either directly or through extensions (102c) of segment 102d. Still another variation is the use of polygon shaped support posts in place of round shaped support posts (103) and vice versa. Thus it is the intention that the appended claims be interpreted as broadly as possible in view of the prior art to include all such variations and modifications.

I claim:

1. A micro-mirror device comprising:
   a doped semiconductor hinge comprising a post supported on and extended from a substrate having a cantilever formed as a thin-narrow-plate extended from said post wherein said cantilever further having a mirror supporting platform as a separate cantilever segment for supporting a micromirror thereon; and
   said post supported on and extended from said substrate is further formed as a hollow post comprising sidewalls with said cantilever extending vertically from one of said side-walls as a vertical cantilever for connecting to said mirror supporting platform as a horizontal mirror supporting platform as said separate cantilever segment.

2. The micromirror device of claim 1 wherein:
   said doped semiconductor hinge is composed of a material selected from a group of semiconductors consisting of elemental semiconductors, III–V compound semiconductors, II–VI compound semiconductors, IV compound semiconductors, and alloy semiconductors.

3. The micromirror device of claim 1 wherein:
   said doped semiconductor hinge is formed by employing a semiconductor formation process selected from a group of semiconductor formation processes consisting of deposition by solid-phase epitaxy, deposition by vapor-phase epitaxy, deposition by liquid-phase epitaxy, deposition by molecular-beam epitaxy, thin film deposition by physical evaporation, thin film deposition by electron-beam evaporation, thin film deposition by filament evaporation, thin film deposition by flash evaporation, thin film deposition by sputtering, thin film deposition by CVD, bulk substrate wafer slice from single crystal ingot, SOS substrate, and SOI substrate.

4. The micromirror device of claim 1 wherein:

said doped semiconductor hinge is doped with an doping impurity selected from a group doping impurities consisting of group III elements, group IV elements, group V elements, and group VII elements is introduced into said semiconductor.

5. The micromirror device of claim 4 wherein:

said doped semiconductor hinge is doped with said doping impurity by employing a doping process selected from a group of doping processes consisting of ion-implantation, constant-source diffusion, limited-source diffusion, two-step diffusion, substrate autodoping, substrate out-diffusion, in situ deposition, and in situ crystallization.

6. The micromirror device of claim 5 wherein:

said doped semiconductor hinge is doped with said doping impurity selected from a group of doping impurities consisting of solid doping impurities, liquid doping impurities, vapor doping impurities, and gas doping impurities.

7. The micromirror device of claim 6 wherein:

said doped semiconductor hinge is doped with said doping impurity formed from a source of doping impurity selected from a group of doping impurity sources consisting of PSG, BSG, BPSG, AsSG, SbSG, Arsine, diborane, phosphine, boron trioxide, trimethylborate, boron nitride, boron tribromide, phosphorus pentoxide, ammonium monophosphate, ammonium diphosphate, phosphorus oxychloride, arsenic trioxide, antimony trioxide, antimony pentachloride, silane, dichlorosilane, and stabine.

8. The micromirror device of claim 7 wherein:

said doped semiconductor hinge is annealed by a process selected from a group of annealing processes consisting of furnace annealing, laser annealing, rapid thermal annealing, lamp annealing, and electrical conduction heating.

9. The micromirror device of claim 1 wherein:

said micro-mirror is assembled by a process selected from a group of processes consisting of self-assembly, adhesive bonding, silicon fusion bonding, anodic bonding, and monolithic fabrication.

10. The micromirror device of claim 1 wherein:

said doped semiconductor hinge is composed of a material selected from a group of semiconductors consisting of amorphous silicon, polycrystalline silicon, and single crystal silicon.

11. The micromirror device of claim 1 further comprising:

a second post for supporting a second micromirror with said second post supported on and extended from said substrate is further formed as a hollow post comprising side-walls with said cantilever extending from one of said side-walls.

12. The micromirror device of claim 1 wherein:

said post extending above a top surface of said substrate with a vertical height above said top surface.

13. The micromirror device of claim 1 wherein:

said post extending to a top surface of said substrate with a zero vertical height above said top surface.

* * * * *